United States Patent
Sadovsky et al.

(10) Patent No.: US 9,444,708 B2
(45) Date of Patent: Sep. 13, 2016

(54) DETECTION OF OUTAGE IN CLOUD BASED SERVICE USING SYNTHETIC MEASUREMENTS AND ANONYMIZED USAGE DATA

(71) Applicant: Microsoft Corporation, Redmond, WA (US)

(72) Inventors: Art Sadovsky, Bellevue, WA (US); Olga Ivanova, Redmond, WA (US); Venkat Narayanan, Redmond, WA (US); Smita Ojha, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 14/447,577

(22) Filed: Jul. 30, 2014

(65) Prior Publication Data
US 2016/0036670 A1    Feb. 4, 2016

(51) Int. Cl.
*H04L 12/26*    (2006.01)
*H04L 12/24*    (2006.01)

(52) U.S. Cl.
CPC ....... *H04L 43/0817* (2013.01); *H04L 41/0636* (2013.01); *H04L 41/5035* (2013.01); *H04L 41/5038* (2013.01); *H04L 41/5096* (2013.01)

(58) Field of Classification Search
CPC .... G06F 11/07; G06F 11/30; G06F 11/3072; G06F 11/34; H04L 41/0816; H04L 63/1416; H04L 43/00; H04L 43/045; H04L 43/0852; H04L 43/0888; H04L 43/16
USPC ....................................................... 709/224
See application file for complete search history.

(56) References Cited

U.S. PATENT DOCUMENTS

| | | | |
|---|---|---|---|
| 8,200,372 B2 | 6/2012 | Joos et al. | |
| 8,600,685 B2 | 12/2013 | Kalgren et al. | |
| 8,983,961 B2* | 3/2015 | Chan | G06F 9/455 707/639 |
| 9,197,495 B1* | 11/2015 | Rauser | H04L 41/0677 |
| 2008/0147684 A1* | 6/2008 | Sadovsky | G06Q 10/10 |
| 2012/0023221 A1* | 1/2012 | Dayan | G06F 11/3006 709/224 |
| 2013/0275518 A1* | 10/2013 | Tseitlin | G06F 11/36 709/206 |
| 2014/0172371 A1* | 6/2014 | Zhu | G06F 11/0709 702/185 |
| 2015/0032887 A1* | 1/2015 | Pesek | G06F 21/305 709/224 |

OTHER PUBLICATIONS

Viswanathan, et al., "Ranking Anomalies in Data Centers", In Proceedings of IEEE Network Operations and Management Symposium, Apr. 16, 2012, 9 pages.
Chen, et al., "Online Tracking of Component Interactions for Failure Detection and Localization in Distributed Systems", In IEEE Transactions on Systems, Man, and Cybernetics, Part C: Applications and Reviews, vol. 37, Issue: 4, Jul. 2007, 8 pages.

(Continued)

*Primary Examiner* — Ruolei Zong
(74) *Attorney, Agent, or Firm* — Damon Rieth; Jim Ross; Micky Minhas

(57) ABSTRACT

Outage detection in a cloud based service is provided using synthetic measurements and anonymized usage data of the cloud based service. Synthetic measurements and usage data are processed through a shared aggregator to generate aggregated data. The synthetic measurements and the usage data are analyzed through a decision tree to correlate an outage based on the synthetic measurements and the usage data. A confidence value is assigned to the outage. An alert is generated that includes information associated with the outage and the confidence value.

20 Claims, 7 Drawing Sheets

(56) References Cited

OTHER PUBLICATIONS

Tian, et al., "Probabilistic Failure Detection for Efficient Distributed Storage Maintenance", In Proceedings of the 2008 Symposium on Reliable Distributed Systems, Oct. 6, 2008, 10 pages.

Kavulya, et al., "Draco: Statistical Diagnosis of Chronic Problems in Large Distributed Systems", In Proceedings of the 42nd Annual IEEE/IFIP International Conference on Dependable Systems and Networks, Jun. 25, 2012, 12 pages.

Leners, et al., "Improving Availability in Distributed Systems with Failure Informers", In Proceedings of 10th USENIX Symposium on Networked Systems Design and Implementation, Apr. 2, 2013, 15 pages.

\* cited by examiner

DETECTION OF OUTAGE IN CLOUD BASED SERVICE USING SYNTHETIC MEASUREMENTS AND ANONYMIZED USAGE DATA

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

Conventional error monitoring solutions for cloud computing systems have limitations. Individual components of the cloud computing systems monitor health related metrics locally. Information generated by monitoring processes are usually consumed locally. Any actions based on the information are attempted locally and results of the actions may be logged or discarded locally.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing outage detection in a cloud based service using synthetic measurements and anonymized usage data. In some example embodiments, a management application of the cloud based service may process synthetic measurements and usage data through a shared aggregator to generate aggregated data. Synthetic measurements may include a simulation of a customer experience which may include one or more customer actions associated with a use scenario of the cloud based service by a customer. The usage data may include measurements of customer actions associated with use scenarios of the cloud based service by customers. The synthetic measurements and the usage data may be analyzed through a decision tree to correlate an outage based on the synthetic measurements and the usage data. A confidence value may be assigned to the outage. An alert may be generated that includes information associated with the outage and the confidence value.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
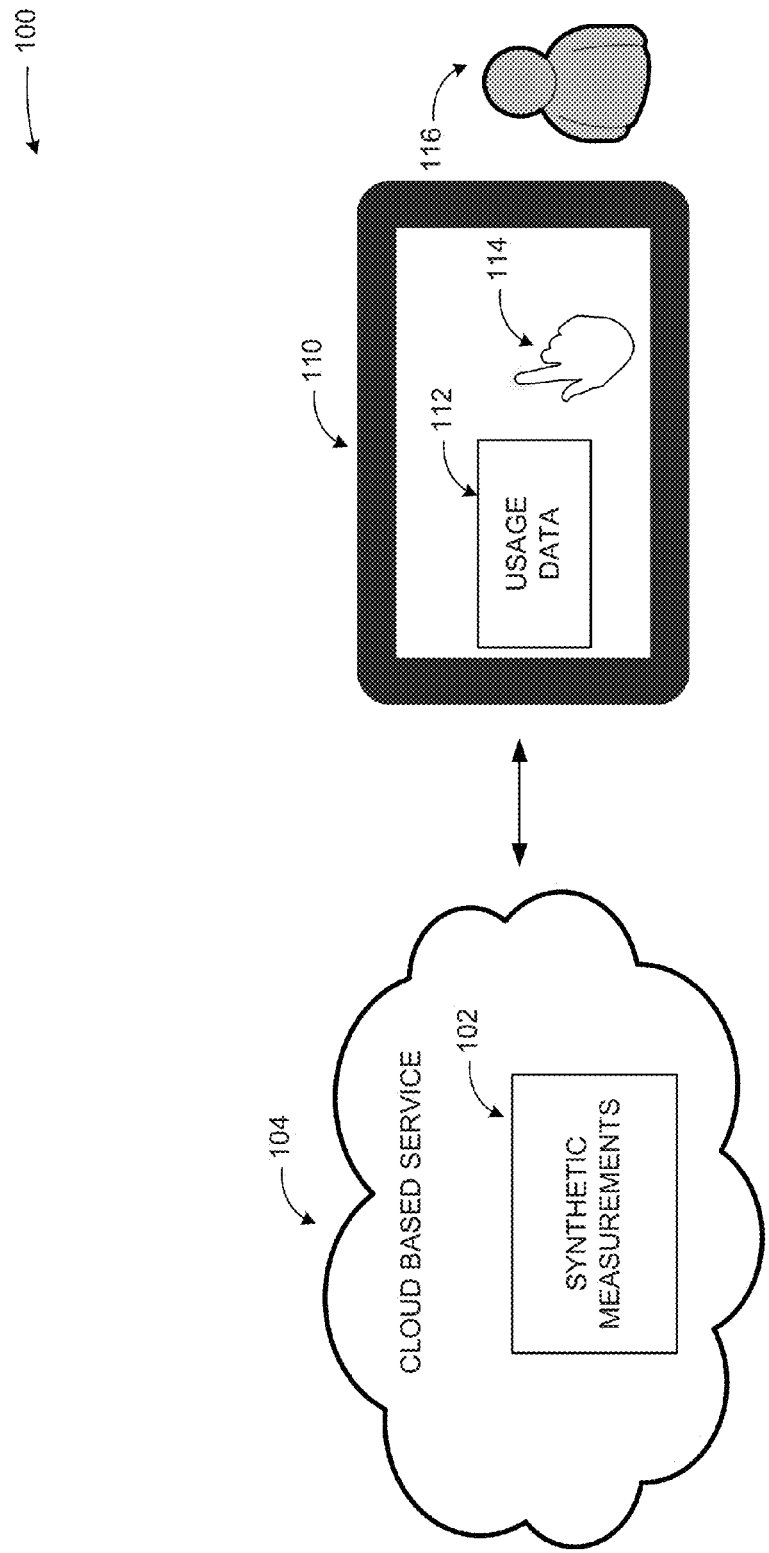
FIG. 1 is a conceptual diagram illustrating an example of outage detection in a cloud based service using synthetic measurements and anonymized usage data, according to embodiments.

As briefly described above, detection of an outage in a cloud based service may be provided using synthetic measurements and anonymized usage data by a management application. Synthetic measurements and usage data may be processed through a shared aggregator to generate aggregated data. The synthetic measurements and the usage data may be analyzed through a decision tree to correlate an outage based on the synthetic measurements and the usage data. A confidence value may be assigned to the outage. An alert may be generated that includes information associated with the outage and the confidence value.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide outage detection in a cloud based service using synthetic measurements and anonymized usage data. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of outage detection in a cloud based service using synthetic measurements and anonymized usage data, according to embodiments.

In a diagram 100, a cloud based service 104 may provide services to a customer 116 through a client device 110. The cloud based service 104 may provide an expansive variety of services through a client interface at the client device 110. The services may include document sharing, e-mail services, storage services, among others. In addition, the customer 116 (who is authorized to interact with the client device 110) may be an entity that includes a person, multiple persons, a group of persons, an organization, among others.

The cloud based service 104 may be a distributed application that provides services through one or more computing devices that execute one or more components of the distributed application. The one or more computing devices may be connected through one or more networks that use wired or wireless infrastructure. An example of the cloud based service 104 may include an e-mail service. The e-mail service may be hosted in multiple computing devices. The e-mail service may be divided between the computing devices based on an available processing capacity of each computing device. In another example scenario, the cloud based service 104 may include a document sharing service. The document sharing service may distribute stored documents across multiple computing devices based on available storage capacity of each computing device. The examples of the cloud based service 104 as an e-mail service and a document sharing service were not provided in a limiting sense. The cloud based service 104 may include any distributed computation solution that provides a service to one or more customers such as the customer 116.

The customer 116 may be allowed to interact with the cloud based service 104 through the client device 110. The client device 110 may include a number of computing devices such as a desktop computer, a smart phone, a notebook computer, a tablet computer, among others. The customer 116 may interact with the cloud based service 104 through a client interface of the cloud based service 104 that is provided by the client device 110. Alternatively, the cloud based service 104 may provide the client interface and the client device 110 may render the client interface within a client application. The customer 116 may interact with the client interface through a number of input modalities that may include a touch based action 114, a keyboard based input, a mouse based input, among others. The touch based action 114 may include a number of gestures such as a touch action, a swipe action, among others.

One or more interactions of the customer 116 with the client interface of the cloud based service 104 may be monitored and stored within a usage data 112. The usage data 112 may also be referred to as passive data. The usage data 112 may include measurements for a use scenario associated with the cloud based service 104. An example of the usage data 112 may include measurements captured when the customer 116 initiates the client interface of an e-mail service through actions such as authentication actions and reads one or more e-mails associated with a user account of the customer 116. Another example of the usage data 112 may include measurements captured when the customer 116 initiates an editing client interface of a document sharing service to edit the document. The usage data 112 may also include measurements captured when the customer 116 edits the document and saves the document. The usage data 112 may be anonymized prior to processing by removing private data. An example of private data may include customer identification data such as a location of the customer, among others.

The measurements captured in the usage data 112 may be simulated by synthetic measurements 102 that replicate a customer experience. The customer experience includes a use scenario associated with the customer 116. The synthetic measurements 102 may include a number of commands to replicate the customer experience. The synthetic measurements 102 may be executed on the cloud based service 104 to determine a health of the cloud based service 104. One or more errors associated with the cloud based service 104 may be detected with the synthetic measurements 102 and the usage data 112.

While the example system in FIG. 1 has been described with specific components including the cloud based service 104, the synthetic measurements 102, and usage data 112, embodiments are not limited to these components or system configurations and can be implemented with other system configuration employing fewer or additional components.

Figure 2:
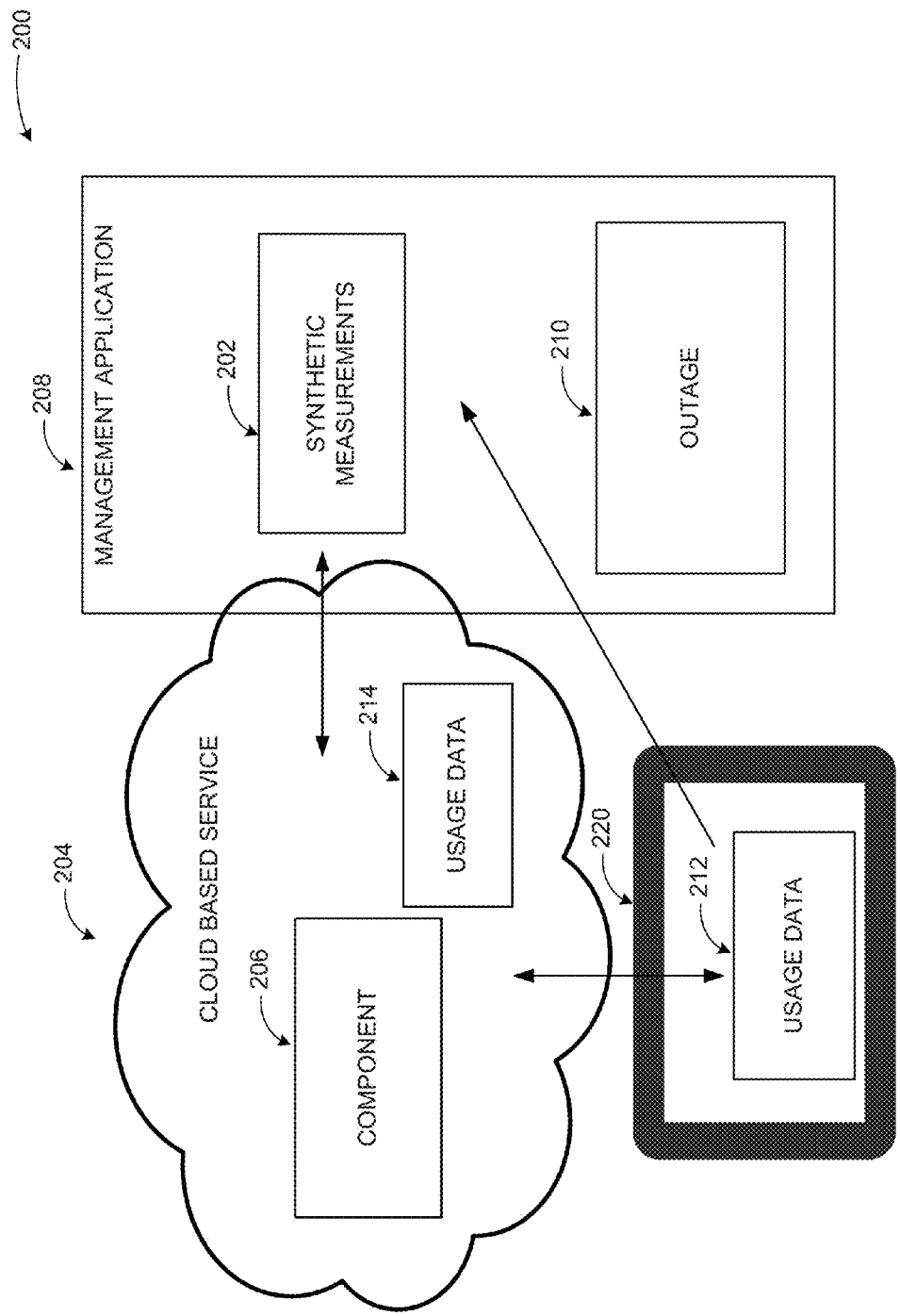
FIG. 2 illustrates components of a scheme to detect an outage in a cloud based service using synthetic measurements and anonymized usage data, according to embodiments.

FIG. 2 illustrates components of a scheme to detect an outage in a cloud based service using synthetic measurements and anonymized usage data, according to embodiments.

In a diagram 200, a scheme to detect an outage 210 on a cloud based service 204 using synthetic measurements 202 and usage data 212 may be described. A management application 208 may correlate the outage 210 from the synthetic measurements 202 and the usage data 212. The synthetic measurements 202 may be executed at the cloud based service 204 to simulate a customer experience. The customer experience may include one or more customer actions that encompass a use scenario of the cloud based service 204 associated with a customer. The synthetic measurements 202 may detect a number of errors associated with a component 206 of the cloud based service. The number of errors may be divided with a total number of executions of the synthetic measurements to compute a percentage value. An inverse operation applied on the percentage value may determine an availability value of the component 206.

The usage data 212 may include measurements of one or more customer actions of one or more use scenarios of the cloud based service 204 by one or more customers. The measurements may capture errors associated with the use scenarios of the cloud based service 204. A client device 220 may capture the usage data 212 and transmit the usage data 212 to an analysis application such as the management application 208. The management application 208 may receive the usage data 212. The usage data 212 may be processed along with the synthetic measurements 202 through a decision tree to correlate the outage 210 of the component 206.

The usage data 212 may be captured in log files by the client device 220. The management application 208 may parse the log files to extract information associated with the outage 210 from the usage data 212 stored in the log files. Alternatively, the management application 208 may retrieve a usage data 214 from other sources such as devices of the cloud based service 204. The cloud based service 204 may allocate resources to capture measurements of use scenarios associated with customers. The measurements may be stored as the usage data 214 and made available to analysis applications such as the management application 208 for monitoring and analysis of the outage 210.

Figure 3:
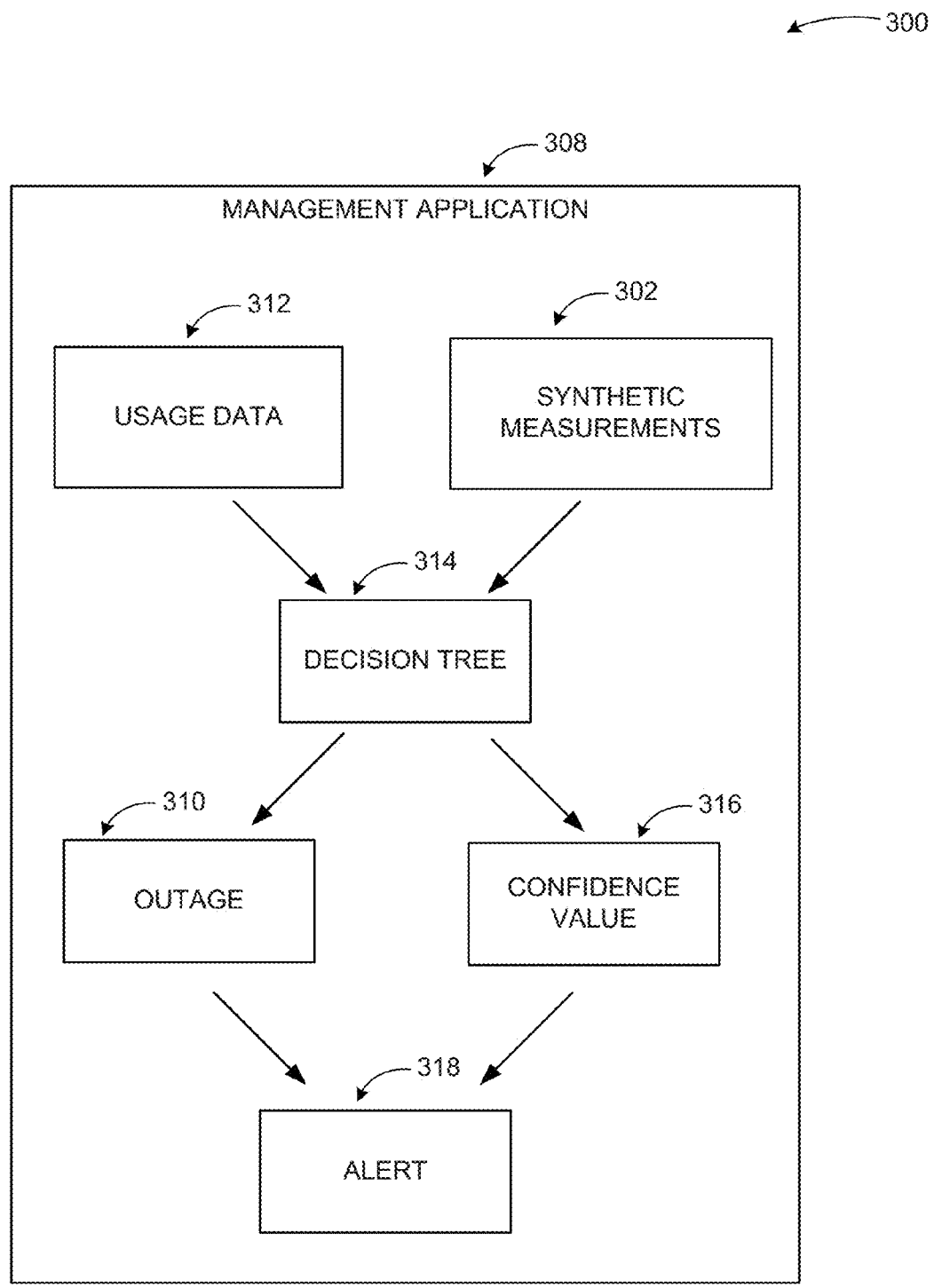
FIG. 3 illustrates detailed view of a scheme to detect an outage in a cloud based service using synthetic measurements and anonymized usage data, according to embodiments.

FIG. 3 illustrates additional components of a scheme to detect an outage in a cloud based service using synthetic measurements and anonymized usage data, according to embodiments.

In a diagram 300, a management application 308 may correlate an outage 310 from synthetic measurements 302 and usage data 312 of a cloud based service. The synthetic measurements 302 and the usage data 312 may be aggregated through a shared aggregator. The shared aggregator may aggregate the synthetic measurements 302 and the usage data 312 based on one or more criteria. The criteria may include a type of a component of the cloud based service, an identification of a component, and similar ones associated with the usage data 312 and the synthetic measurements 302. The shared aggregator may also process the usage data 312 to anonymize the usage data 312 by removing private data.

The aggregated data may be processed through a decision tree 314. The synthetic measurements 302 and the usage data 312 may be processed through the decision tree 314 to correlate the outage 310. Information associated with the component, errors associated with the component, and malfunction associated with the component may be processed and stored in the outage 310 by the management application 308 based on contents of the usage data 312 and the synthetic measurements 302.

A confidence value 316 associated with the outage 310 may be computed by the management application 308. Information associated with the outage 310 and the confidence value 316 may be used to generate an alert 318. The alert 318 may be transmitted to a stakeholder such as an administrator of the cloud based storage or a team that manages that component that causes the outage 310.

According to some examples, the usage data 312 and the synthetic measurements 302 may be processed through the shared aggregator to generate a first stream and a second stream of aggregated data. The first and the second streams may be processed through the decision tree 314 to correlate the outage 310. The outage 310 may be assigned the confidence value 316.

The synthetic measurements 302 may be aggregated into the first stream of the aggregated data. The synthetic measurements 302 may be aggregated based on one or more criteria that includes an identification and a type of an associated component of the cloud based service. The usage data 312 may be aggregated into the second stream of the aggregated data. The usage data 312 may be aggregated based on one or more criteria that includes an identification and a type of an associated component of the cloud based service. Alternatively, the usage data 312 may be aggregated into the first stream and the synthetic measurements 302 may be aggregated into the second stream to correlate the outage 310. The outage 310 may be correlated based on the usage data 312 first by processing the usage data 312 through the logic associated with the decision tree 314 followed by processing of the synthetic measurements 302.

An availability value of a component of the cloud based service may be determined from the synthetic measurements 302. The availability value may be computed by dividing a number of errors associated with the synthetic measurements with a number of the synthetic measurements. An inverse operation may be applied to the resulting value and a result of which may be multiplied by 100 to determine the availability value as a percentage value. The availability value may be determined to fall below a first threshold value. The threshold value may be configured by a stakeholder such as an administrator of the cloud based service or a team that manages the component associated with the synthetic measurements 302. The first threshold may be configured by the stakeholder to increase or decrease a sensitivity associated with a detection of the outage 310.

An error count associated with the second stream may be determined to exceed a second threshold. The second threshold may be configured by the stakeholder to increase or decrease a sensitivity associated with a detection of the outage 310. The error count may correspond to a shared time period with the availability value.

The outage 310 associated with the component may be correlated based on the availability value that failed below the first threshold value and the error count that exceeded a second threshold value. A high confidence value may be assigned to the outage 310 because the availability value failed below the first threshold value that indicated a potential for the outage 310. Processing the error count that exceeds the second threshold value through the decision tree 314 may confirm the outage 310. A high value may be defined as a value that is adjacent to a top of a range such as a value of 8 or 9 out of a range from 0 to 10.

Alternatively, the management application 308 may determine that the error count associated with the second stream may fall below the second stream by a small variance during a shared time period with the availability value. A range of the small variance may be configured by the stakeholder. An example of small variance may be a value of 5 out of an error count of 65 that falls below a second threshold of 70. The small variance may be used as a tool to correlate the outage 310 after a confirmation of a potential for the outage 310 from the first stream. The error count associated with the second stream may not be sufficient to exceed the second threshold. The outage 310 may still be correlated if the error count is within a small variance of the second threshold. A medium value may be assigned as the confidence value for the outage 310 as a result of correlating the outage 310 through the decision tree with an availability value that falls below the first threshold value and the error count that falls below the second threshold by a small variance. The medium value may be defined as a value that is in the middle of a range such as a value of 5 or 6 within a range of 0 to 10.

Although above examples were provided with the synthetic measurements 302 processed through the decision tree 314 as the first stream and the usage data 312 as the second stream, the above examples were not provided in a limiting sense. The usage data 312 may be processed through the decision tree 314 as the first stream to analyze the error count followed by the synthetic measurements 302 as the second stream to correlate the outage 310. In addition, examples of detection of the outage 310 were not provided in a limiting sense, a number of outages may be correlated from availability values computed from the synthetic measurements 302 and error counts computed from the usage data 312.

Figure 4:
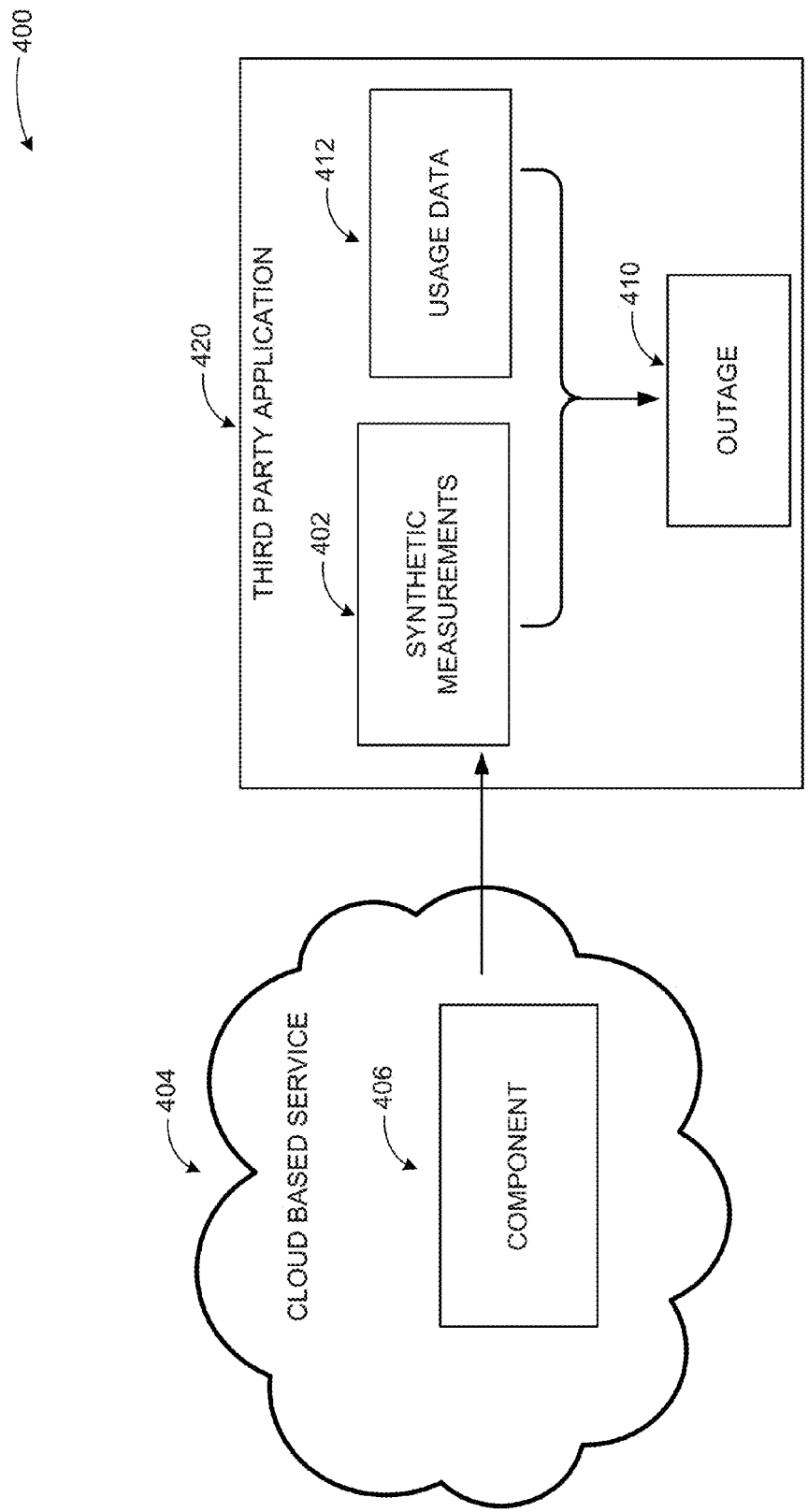
FIG. 4 illustrates another example of a scheme to detect an outage in a cloud based service using synthetic measurements and anonymized usage data, according to embodiments.

FIG. 4 illustrates another example of a scheme to detect an outage in a cloud based service using synthetic measurements and anonymized usage data, according to embodiments.

In a diagram 400, a third party application 420 may correlate an outage 410 from synthetic measurements 402 and usage data 412. The third party application may be authorized to retrieve the synthetic measurements 402 and the usage data 412 from a cloud based service 404. An authentication scheme of the cloud based service 404 may verify an authorization of the third party application 420 to retrieve the synthetic measurements 402 and the usage data 412. The cloud based service 404 may also transmit the synthetic measurements 402 and the usage data 412 to the third party application 420 on demand or on a schedule.

The third party application 420 may process the synthetic measurements 402 and the usage data 412 to determine an availability value associated with the component 406 and an error count associated with the component 406 measured within a shared time period. The availability value and the error count may be processed through a decision tree to correlate the outage 410 in processes similar to the processes described in diagram 300. The third party application may execute number of actions upon correlation of the outage 410. The action may alert a stakeholder, transmit a corrective action request to the cloud based service 404 to resolve the outage 410, generate a report associated with the outage 410, among others. Examples of detection of the outage 410 were not provided in a limiting sense, a number of outages may be correlated from availability values computed from the synthetic measurements 402 and error counts computed from the usage data 412.

The technical effect of detection of outage in a cloud based service using synthetic measurements and anonymized usage data may be enhancements in failure detection and outage reporting to encompass the distributed system and components of the distributed system compared to individual component based solutions.

The example scenarios and schemas in FIGS. 2 and 4 are shown with specific components, data types, and configurations. Embodiments are not limited to systems according to these example configurations. Providing outage detection in a cloud based service using synthetic measurements and anonymized usage data may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
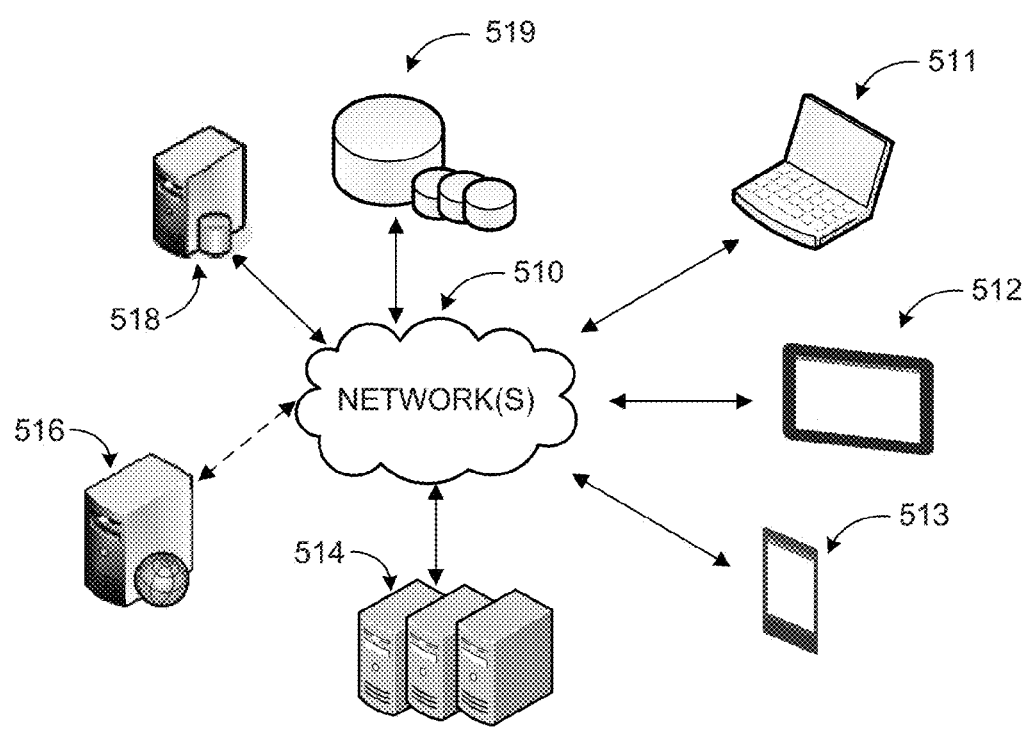
FIG. 5 is a simplified networked environment, where a system according to embodiments may be implemented.

FIG. 5 is an example networked environment, where embodiments may be implemented. A management application configured to provide outage detection in a cloud based service using synthetic measurements and anonymized usage data may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A management application may correlate an outage from synthetic measurements and anonymized usage data associated with a component of a cloud based service. The outage may be assigned a confidence value and presented to a stakeholder through an alert. The management application may store data associated with the synthetic measurements and the usage data in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide outage detection in a cloud based service using synthetic measurements and anonymized usage data. Furthermore, the networked environments discussed in FIG. 5 are for illustration purposes only. Embodiments are not limited to the example applications, modules, or processes.

Figure 6:
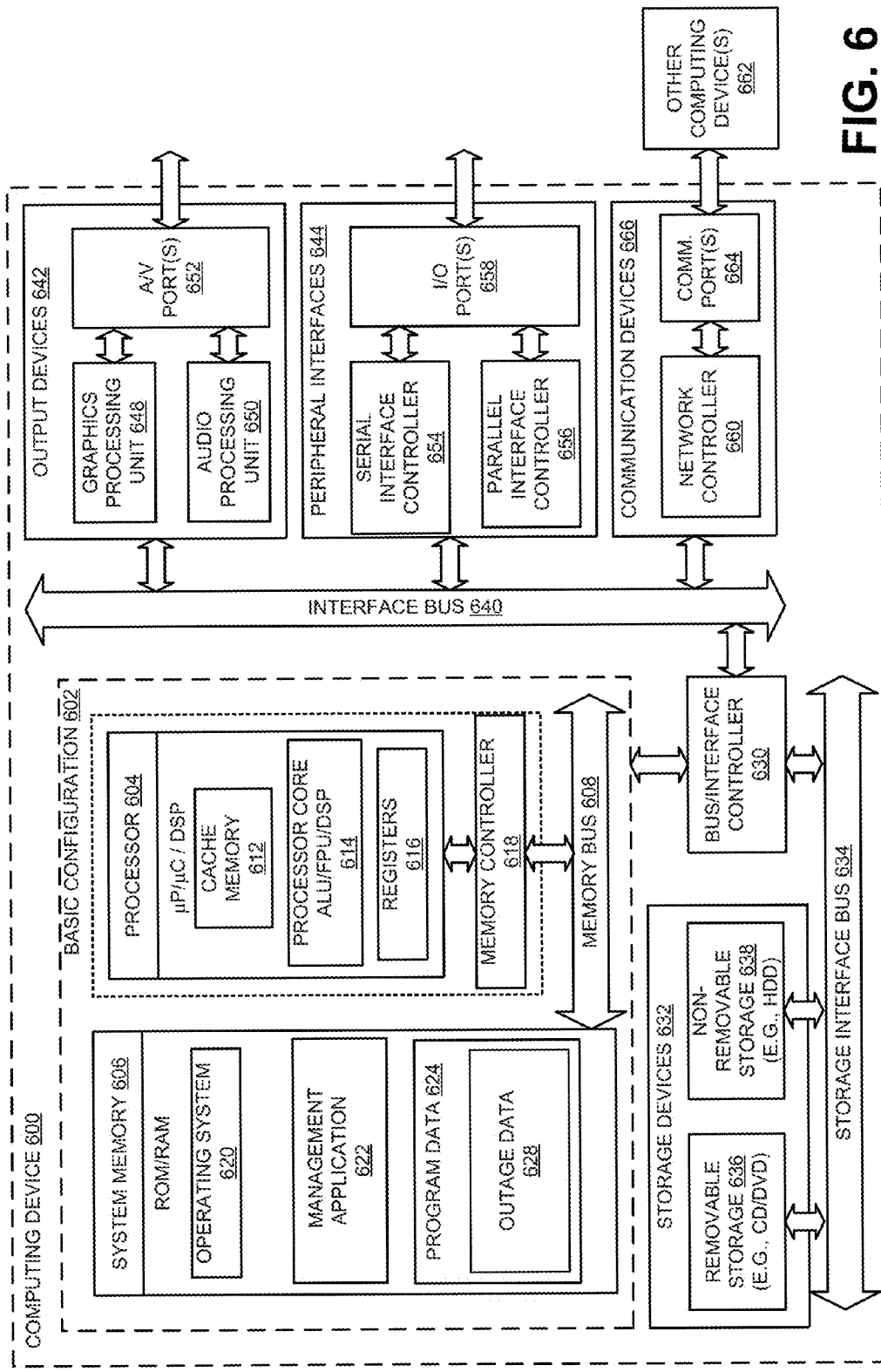
FIG. 6 illustrates a general purpose computing device, which may be configured to provide outage detection in a cloud based service using synthetic measurements and anonymized usage data.

FIG. 6 illustrates a general purpose computing device, which may be configured to provide outage detection in a cloud based service using synthetic measurements and anonymized usage data, arranged in accordance with at least some embodiments described herein.

For example, the computing device 600 may be used to provide outage detection in a cloud based service using synthetic measurements and anonymized usage data. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management application 622, and a program data 624. The management application 622 may correlate an outage from synthetic measurements and anonymized usage data associated with a cloud based service. The management application 622 may assign an confidence value to the outage and present the outage and the confidence value through an alert. The program data 624 may include, among other data, a outage data 628, or the like, as described herein. The outage data 628 may include information associated with the availability value computed from the synthetic measurement and error count computed from the usage data.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more AN ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include outage detection in a cloud based service using synthetic measurements and anonymized usage data. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by preselected criteria that may be machine automated.

Figure 7:
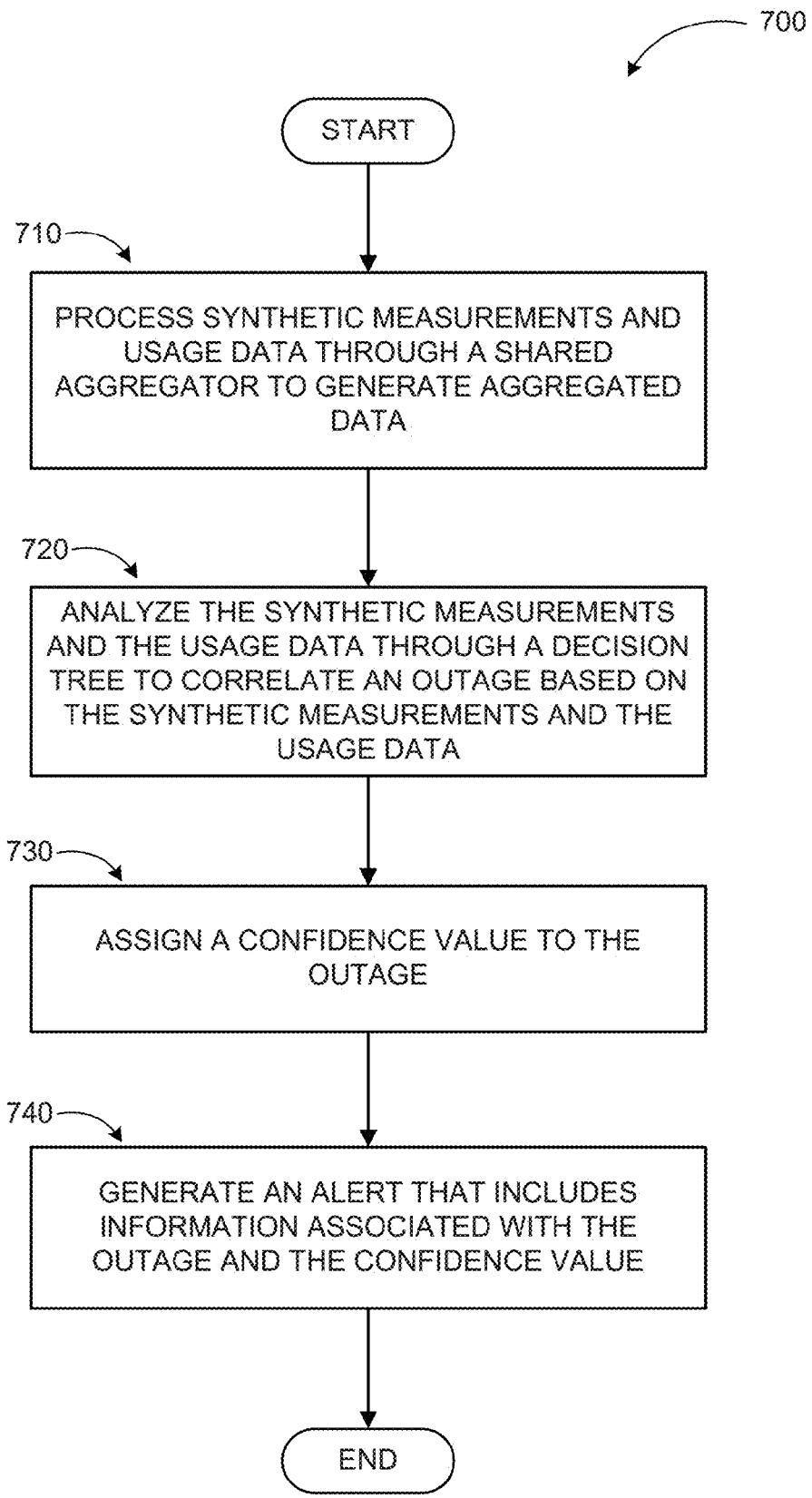
FIG. 7 illustrates a logic flow diagram for a process to provide outage detection in a cloud based service using synthetic measurements and anonymized usage data, according to embodiments.

FIG. 7 illustrates a logic flow diagram for a process to provide outage detection in a cloud based service using synthetic measurements and anonymized usage data, according to embodiments. Process 700 may be implemented on a management application of the cloud based service.

Process 700 begins with operation 710, where synthetic measurements and usage data may be processed through a shared aggregator to generate aggregated data. The synthetic measurements and the usage data may be analyzed through a decision tree to correlate an outage based on the synthetic measurements and the usage data, at operation 720. At operation 730, a confidence value may be assigned to the outage. An alert may be generated that includes information associated with the outage and the confidence value, at operation 740.

The operations included in process 700 are for illustration purposes. A management application according to embodiments may be implemented by similar processes with fewer or additional steps, as well as in different order of operations using the principles described herein.

According to some examples, a method that is executed on a computing device to detection of an outage in a cloud based service using synthetic measurements and anonymized usage data may be described. The method may include processing synthetic measurements and usage data through a shared aggregator to generate a first stream and a second stream of aggregated data, where private data is removed from the usage data to anonymize the usage data, analyzing the first stream and the second stream through a decision tree to correlate an outage based on the first stream and the second stream, assigning a confidence value to the outage, and generating an alert that includes information associated with the outage and the confidence value.

According to other examples, the synthetic measurements is executed to simulate a customer experience at the cloud based service, where the customer experience includes a use scenario of the cloud based service associated with a customer. The usage data is retrieved from one or more components of the cloud based storage that collect the usage data as measurements of one or more customer actions of one or more use scenarios of the cloud based service associated with one or more customers. The synthetic measurements are aggregated into the first stream of the aggregated data, where the synthetic measurements are aggregated based on one or more criteria that includes an identification and a type of an associated component of the cloud based service. The usage data are aggregated into the second stream of the aggregated data, where the usage data are aggregated based on one or more criteria that includes an identification and a type of an associated component of the cloud based service.

According to further examples, the method may further include determining an availability value associated with the first stream to fall below a first threshold value, where the availability value is associated with a component of the cloud based service. An error count associated with the second stream is determined to exceed a second threshold value, where the error count corresponds to a shared time period with the availability value, the outage associated with the component is correlated based on the availability value and the error count, and a high value is assigned as the confidence value for the outage. An error count associated with the second stream is determined to fall below a second threshold value by a small variance, where the error count corresponds to a shared time period with the availability value, the outage associated with the component is correlated based on the availability value and the error count, and a medium value is assigned as the confidence value for the outage.

According to some examples, the method may further include determining an error count associated with the second stream to exceed a first threshold value, where the error count is associated with a component of the cloud based service. An availability value associated with the first stream is determined to fall below a second threshold value, where the availability value corresponds to a shared time period with the error count, the outage associated with the component is correlated based on the error count and the availability value, and a high value is assigned as the confidence value for the outage. An availability value associated with the first stream is determined to exceed a second threshold value by a small variance, where the availability value corresponds to a shared time period with the error count, the outage associated with the component is correlated based on the error count and the availability value, and a medium value is assigned as the confidence value for the outage.

According to some examples, a computing device to provide detection of an outage in a cloud based service using synthetic measurements and anonymized usage data may be described. The computing device may include a memory, a processor coupled to the memory. The processor may be configured to execute a management application in conjunction with instructions stored in the memory. The management application may be configured to process synthetic measurements and usage data through a shared aggregator to generate aggregated data, where the synthetic measurements include simulations of a customer experience at the cloud based service and the usage data includes measurements of one or more customer actions of one or more use scenarios of the cloud based service and, where private data is removed from the usage data to anonymize the usage data, analyze the synthetic measurements and the usage data through a decision tree to correlate an outage based on the synthetic measurements and the usage data, assign a confidence value to the outage, and generate an alert that includes information associated with the outage and the confidence value.

According to other examples, the management application is further configured to receive the usage data from one or more client devices that interact with the cloud based service, where the one or more client devices provide the cloud based service to one or more customers. The management application is further configured to generate an availability value associated with a component of the cloud based service from the synthetic measurements, where the availability value is a percentage value. and determine the availability value to fall below a first threshold to determine a potential outage. The management application is further configured to compute an error count associated with the component from the usage data within a shared time period with the availability value, determine the error count to exceed a second threshold to correlate the outage from the potential outage, assign a high value as the confidence value, and allow a stakeholder to configure the first threshold and the second threshold, where the stakeholder includes one or more from a set of an administrator of the cloud based service and a team that manages the component.

According to some examples, the management application is further configured to compute an error count associated with a component of the cloud based service from the usage data and determine the error count to exceed a first threshold to determine a potential outage. The management application is further configured to generate an availability value from the synthetic measurements within a shared time period with the error count, where the availability value is a percentage value, determine the availability value to fall below a second threshold to correlate the outage from the potential outage, assign a high value as the confidence value, and allow a stakeholder to configure the first threshold and the second threshold, where the stakeholder includes one or more from a set of an administrator of the cloud based service and a team that manages the component.

According to some examples, a computer-readable memory device with instructions stored thereon to provide detection of an outage in a cloud based service using synthetic measurements and anonymized usage data may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide detection of an outage in a cloud based service using synthetic measurements and anonymized usage data, the method comprising:
processing synthetic measurements and usage data through a shared aggregator to generate a first stream and a second stream of aggregated data, wherein the synthetic measurements include simulations of a customer experience at the cloud based service and the usage data includes measurements of one or more customer actions of one or more use scenarios of the cloud based service, and wherein private data is removed from the usage data to anonymize the usage data;
analyzing the first stream and the second stream through a decision tree to correlate an outage based on the first stream and the second stream;
assigning a confidence value to the outage; and
generating, an alert that includes information associated with the outage and the confidence value.

2. The method of claim 1, further comprising:
executing the synthetic measurements to simulate the customer experience at the cloud based service, wherein the customer experience includes a use scenario of the cloud based service associated with a customer.

3. The method of claim 1, further comprising:
retrieving the usage data from one or more components of the cloud based storage that collect the usage data.

4. The method of claim 1, further comprising:
aggregating the synthetic measurements into the first stream of the aggregated data, wherein the synthetic measurements are aggregated based on one or more criteria that includes an identification and a type of an associated component of the cloud based service.

5. The method of claim 1, further comprising:
aggregating the usage data into the second stream of the aggregated data, wherein the usage data are aggregated based on one or more criteria that includes an identification and a type of an associated component of the cloud based service.

6. The method of claim 1, further comprising:
determining an availability value associated with the first stream to fall below a first threshold value, wherein the availability value is associated with a component of the cloud based service.

7. The method of claim 6, further comprising:
determining an error count associated with the second stream to exceed a second threshold value, wherein the error count corresponds to a shared time period with the availability value;
correlating the outage associated with t le component based on the availability value and the error count; and
assigning a high value as the confidence value Or the outage.

8. The method of claim 6, further comprising:
determining an error count associated with the second stream to fall below a second threshold value by a small variance, wherein the error count corresponds to a shared time period with the availability value;
correlating the outage associated with the component based on the availability value and the error count; and
assigning a medium value as the confidence value for the outage.

9. The method of claim 1, further comprising:
determining an error count associated with the second stream to exceed a first threshold value, wherein the error count is associated with a component of the cloud based service.

10. The method of claim 9, further comprising:
determining, an availability value associated with the first stream to fall below a second threshold value, wherein the availability value corresponds to a shared time period with the error count:
correlating the outage associated with the component based on the error count and the availability value; and
assigning a high value as the confidence value for the outage.

11. The method of claim 9, further comprising:
determining an availability value associated with the first stream to exceed a second threshold value by a small variance, wherein the availability value corresponds to a shared time period with the error count;
correlating the outage associated with the component based on the error count and the availability value; and
assigning a medium value as the confidence value for the outage.

12. A computing device to provide detection of an outage in a cloud based service using synthetic measurements and anonymized usage data, the computing device comprising:
a memory;
a processor coupled to the memory, the processor executing a. management application in conjunction with instructions stored in the memory, wherein the management application is configured to:
process synthetic measurements and usage data through a shared aggregator to generate aggregated data, wherein the synthetic measurements include simulations of a customer experience at the cloud based service and the usage data includes measurements of one or more customer actions of one or more use scenarios of the cloud based service and, wherein private data is removed front the usage data to anonymize the usage data;
analyze the synthetic measurements and the usage data through a decision tree to correlate an outage based on the synthetic measurements and the usage data;
assign a confidence value to the outage; and
generate an alert that includes information associated with he outage and the confidence value.

13. The computing device of claim 12 wherein the management application is further configured to:
receive the usage data from one or more client devices that interact with the cloud based service, wherein the one or more client devices provide the cloud based service to one or more customers.

14. The computing device of claim 12, wherein the management application is further configured to:
generate an availability value associated with a component of the cloud based service from the synthetic measurements, wherein the availability value is a percentage value; and
determine the availability value to fall below a first threshold to determine a potential outage.

15. The computing device of claim 14, wherein the management application is further configured to:
compute an error count associated with the component from the usage data within a shared time period with the availability value;

determine the error count to exceed a second threshold to correlate the outage from the potential outage;

assign a high value as the confidence value; and allow a stakeholder to configure the first threshold and the second threshold, wherein the stakeholder includes one or more from a set of an administrator of the cloud based service and a team that manages the component.

16. The computing device of claim 12, wherein the management application is further configured to:

compute an error count associated with a component of the cloud based service from the usage data; and determine the error count to exceed a first threshold to determine a potential outage.

17. The computing device of claim 16, wherein the management application is further configured to:

generate an availability value from the synthetic measurements within a shared time period with the error count, wherein the availability value is a percentage value;

determine the availability value to fall below a second threshold to correlate the outage from the potential outage;

assign a high value as the confidence value; and allow a stakeholder to configure the first threshold and the second threshold, wherein the stakeholder includes one or more from a set of an administrator of the cloud based service and a team that manages the component.

18. A computer-readable memory device with instructions stored thereon to provide detection of an outage in a cloud based service using synthetic measurements and anonymized usage data, the instructions comprising:

processing synthetic measurements and usage data through a shared aggregator to generate a first stream and a second stream of aggregated data, wherein the synthetic measurements include simulations of a customer experience at the cloud based service and the usage data includes measurements of one or more customer actions of one or more us scenarios of the cloud based service and, wherein private data is removed from the usage data to anonymize the usage data;

analyzing the synthetic measurements and the usage data through a decision tree to correlate an outage of a component of the cloud based service based on the synthetic measurements and the usage data;

assigning a confidence value to the outage; and generating an alert that includes information associated with the outage and the confidence value.

19. The computer-readable memory device of claim 18, wherein the instructions further comprise:

generating, an availability value associated with a component of the cloud based service from the synthetic measurements, wherein the availability value is a percentage value;

determining, the availability value to fall below a first threshold to determine a potential outage;

computing an error count associated with the component from the usage within a shared time period with the availability value;

determining the error count to exceed a second threshold to correlate the outage from the potential outage;

assigning a high value as the confidence value; and allowing a stakeholder to configure the first threshold and the second threshold, wherein the stakeholder includes one or more from a set of an administrator of the cloud based service and a team that manages the component.

20. The computer-readable memory device of claim 18, wherein the instnicnons further comprise:

computing an error count associated with the component from the usage data;

determining the error count to exceed a first threshold to determine a potential outage;

generating an availability value from the synthetic measurements within a shared time period with the error count, wherein the availability value is a percentage value;

determining the availability value to fall below a second threshold to correlate the outage from the potential outage;

assigning a high value as the confidence value; and allowing a stakeholder to configure the first threshold and the second threshold, wherein the stakeholder includes one or more from a set of an administrator of the cloud based service and a team that manages the component.

* * * * *